July 23, 1940.  W. T. MURDEN  2,208,700

BEARING SEAL

Filed March 2, 1938

INVENTOR:
WILLIAM T. MURDEN,
BY
HIS ATTORNEY.

Patented July 23, 1940

2,208,700

UNITED STATES PATENT OFFICE 2,208,700

BEARING SEAL

William T. Murden, Bristol, Conn., assignor to General Motors Corporation, Detroit, Mich., a corporation of Delaware Application March 2, 1938, Serial No. 193,526

10 Claims. (Cl. 286—11)

This invention relates to bearings, and more particularly to seals therefor whereby loss of a lubricant from the bearing is avoided and ingress of water and other deleterious substances is prevented from entering into the bearing.

One object is to provide such a seal structure that has a wear-resistant contact between relatively rotatable elements and yet has sufficient freedom of movement to maintain an effective sealing relationship even under conditions of misalignment of the bearing parts, and a further object is to provide such a seal which is simple, easily assembled, and can be composed of parts readily blanked out from strip materials.

To these ends, and also to improve generally upon devices of the character indicated, my invention consists in the various matters hereinafter described and claimed.

Figure 1:
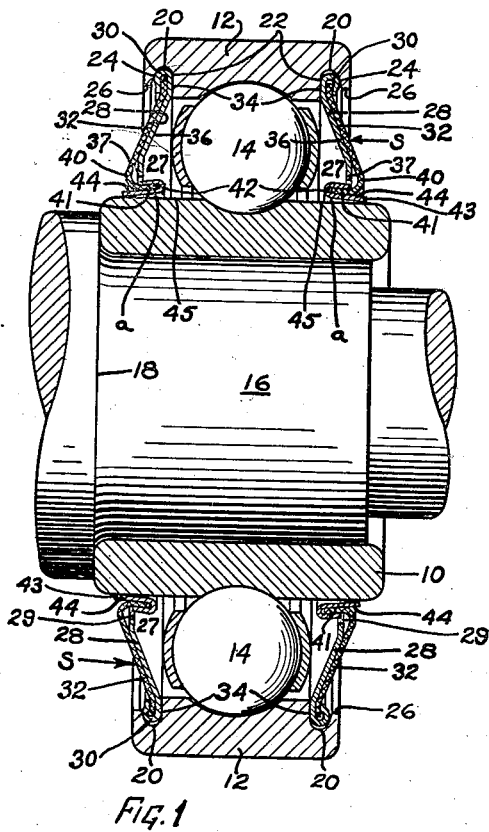
Figure 2:
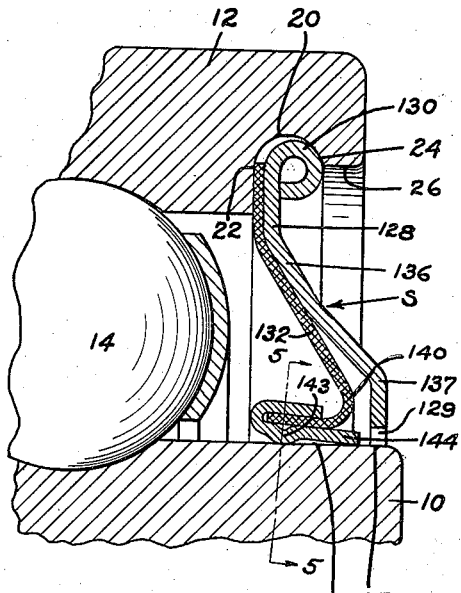
Figure 5:
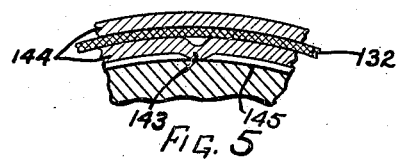
Figure 3:
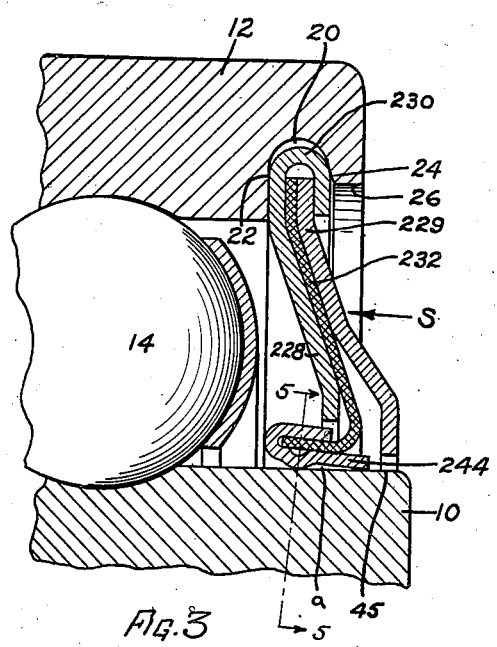
Figure 4:
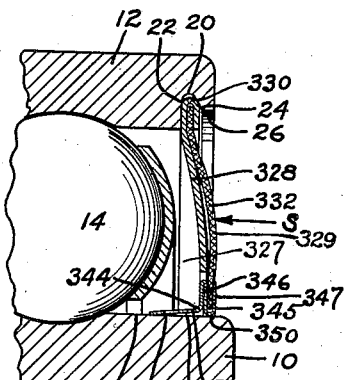

In the accompanying drawing:

Figure 1 is a view chiefly in diametrical section through a mounted bearing and seal in accordance with my invention;

Figures 2, 3, and 4 are fragmentary, enlarged, cross sectional views illustrating other embodiments of my invention; and Figure 5 is a fragmentary, enlarged, section taken substantially along the lines 5—5 of Figures 2 and 3, looking in the direction of the arrows.

Generally stated, in the embodiments herein illustrated each of my sealing devices, S, includes a substantially rigid, wear-resistant sealing ring, as 44, that surrounds and slidably but effectively engages in sealing contact with the inner race ring 10 of a ball bearing and is secured in leak-proof engagement to a freely flexible but impervious diaphragm, as 32, which is secured in unit-handling, leak-proof relation to the cooperating outer race ring 12, so that the space between the bearing race rings is effectively sealed and closed at all times, for even if the race rings become located out of coaxial alignment, the flexible diaphragm, which has ample quantity of material, will yieldably permit the sealing ring to remain in sealing relation with the inner race ring 10, and the closure between the race rings will remain intact.

Referring now particularly to the drawing, in the embodiment illustrated by Figure 1 a guard or holder 28, preferably of sheet metal bent to an annular dish-shaped form, is provided with an outer curled-over edge 30 bent back towards itself into firm gripping and sealing engagement with the outer peripheral edge of the annular diaphragm 32 which may be composed of any suitable relatively thin, easily flexible sheet material, such, for example, as rubber, or woven, or pressed fibrous material impervious to moisture and lubricants. This outer curled edge 30 is seated in wedged engagement between the relatively angularly disposed side walls 22 and 24 of a peripheral groove 20 within the outer race ring 12. The inner wall 22 is preferably in a plane generally perpendicular to the axis of the bearing and the outer wall 24 diverges from the inner wall towards the bearing axis and terminates in an annular land 26 of a diameter intermediate that of the top and of the bottom of the groove 20 so that the holder 28 may be inserted past the land 26 into the groove and be seated in sealed engagement with the side walls 22 and 24 without bottoming in the groove 20, and in a manner to be later described. A plane annular face 34 on the outer portion of the holder 28 firmly abuts the side wall 22 to locate the holder in a predetermined position. An intermediate zone 36 of the holder is bent outwardly from the bearing balls 14 to partially support the flexible diaphragm 32, and an inner annular holder portion 37, provided with a substantially central bore 29, is preferably bent to lie away from the diaphragm to facilitate a freely flexing movement of an inner portion of the latter, which is bent back at 40 to provide a tube 41 surrounding the inner race ring 10 in spaced relation and directed generally towards the bearing balls 14.

A substantially rigid, wear-resistant, sealing ring 44, preferably shaped from sheet brass or other material that is relatively soft as compared to the hardened race ring 10 which it surrounds, freely extends through the bore 29 and is bent back upon itself at its inner end 42 into clamped sealing engagement with the tubular portion 41 of the diaphragm, while the outer end 43 of the sealing ring is in annular wiping contact with the cylindrical face 45 of the inner race ring 10 to provide the desired seal with the latter. I preferably slant the body portion of the ring 44 with respect to the cooperating surface 45 of the race ring 10 so that only the outer edge 43 of the sealing ring engages the race ring 10 and the sealing ring forms a capillary angle $a$ of, for example, four degrees which aids in maintaining the required seal by restricting water and other deleterious substances from entering the closed lubricant chamber 27, and I prefer to employ in this chamber grease of a sufficiently non-fluid consistency to be sealed in the chamber 27 free from any capillary influence.

Thus, ample material being provided in the diaphragm, not only is there effective sealing of the space between the race rings 10 and 12 under desired operating conditions, but also even when misalignment occurs between these rings the diaphragm, still in sealing connection with the outer race ring 12, freely flexes and yields sufficiently to enable the sealing ring 44 to follow the inner race ring 10 into its misaligned positions and to maintain its sealing contact with the race ring 10.

The end of the inner race ring 10 engaged by the sealing ring 44 preferably extends laterally beyond the end of the outer race ring 12 to provide an ample length of the cylindrical surface 45 for engagement with the sealing ring 44, and I preferably employ similar sealing devices S which engage the inner race ring extensions and are respectively located in opposed relation at the ends of the bearing for cooperatively sealing the ends of the closed lubricant chamber 27. The inner race ring 10 may be mounted on a shaft 16 against a shoulder 18, and the outer race ring 12 may be mounted in any suitable housing, not shown, and if this housing encloses the end of the shaft 16 (as is frequently the case in some motor constructions) a sealing device need not be employed in such closed end.

In the assembly of my sealing device in unit-handling relation with the bearing, the sealing ring 44 has its inner end clamped over the inner periphery of the diaphragm 32. The outer edge of the holder 28 is partially curled over and inserted past the land 26 into the groove 20, and the sealing ring 44 is mounted on the surface 45 with the diaphragm bent back to position its outer peripheral edge within the partially curled-over portion of the holder 28. This partially curled-over edge is then further bent over into clamped sealing contact with the diaphragm and into wedged sealing engagement with the groove walls 22 and 24 in the same manner as disclosed in the United States patent numbered 1,917,987 and issued to Large on July 11, 1933.

Referring now to the embodiment illustrated in Figure 2, an annular diaphragm 132, generally similar to the diaphragm 32, is tightly clamped and sealed against the inner wall 22 of the groove 20 by an annular sheet metal holder 128 whose outer peripheral edge 130 is curled back upon itself and wedged between the outer peripheral portion of the diaphragm and the sloping wall 24 of the groove 20. The holder 128, which provides a guard outside of the diaphragm 132, has an intermediate sloping portion 136 partially supporting the diaphragm, and an inner portion 137 of the holder extends from this intermediate portion 136 in spaced relation to the inner zone 140 of the diaphragm which is free to flex in the manner previously described. The holder 128 is centrally apertured at 129 to freely receive the projecting end of the inner race ring 10 without restricting the normal movements of this race ring, and a sealing ring 144, generally similar to the sealing ring 44 and secured to the diaphragm in substantially the same manner, is aided in maintaining the required capillary angle $a$ with the surface 45 by a plurality of internally disposed peripherally spaced struck-up knobs 143 which slidably engage the cylindrical face 45. As described in the embodiment shown in Figure 1, the edge 130 is partially curled before insertion in the groove 20 and then further curled over to its final seated position.

Another embodiment of my invention, which combines the features of the structures shown in Figures 1 and 2, is illustrated in Figure 3 wherein a diaphragm 232 similar to the diaphragm 132 and similarly engaged by a sealing ring 244 like the ring 144 of Figure 2, is guarded on both sides by the respective annular dish shaped sheet metal guards or holders 228 and 229, the member 228 having its outer edge 230 curled back into clamped engagement with the outer peripheral portion of the member 229 and in wedged seating engagement between the side walls 22 and 24 of the groove 20 in the same manner as shown and described in the embodiment illustrated in Figure 1. The edge 230 is partially curled over into initial gripping engagement with the member 229 before assembly with the bearing so that the parts of the seal are in unit-handling relation and may be mounted as a unit in the groove 20 in the manner disclosed in the United States patent numbered 1,917,987 and issued to Large on July 11, 1933. The inner portions of the holders 228 and 229 which are centrally apertured to permit freedom of movement of the inner race ring 10 and the sealing ring 244, are bent to lie away from the diaphragm to facilitate freely flexing movements of the latter so that the sealing ring 244 may always be maintained in the required sealing contact with the inner race ring 10.

Another embodiment of my invention is illustrated in Figure 4 wherein an annular sheet metal holder 328 has a curled over peripheral outer edge 330 bent back upon itself into clamping engagement with the outer edge of the annular flexible diaphragm 332 and seated in wedged engagement with the walls 22 and 24 of the groove 20 as previously described with relation to Figure 1. The holder 328, which is bent outwardly to partially support and guide the diaphragm, is centrally apertured to freely receive the inner race ring 10 and the sealing ring 344 without restricting their normal movements. The diaphragm is preferably of a slightly larger diameter than that within the curled over edge 330 in which the diaphragm is mounted so that an intermediate diaphragm portion 329 will buckle away from the holder 328 and yieldably permit the sealing ring to follow the inner race ring 10 and to remain in sealing contact with the surface 45 even when the race rings 10 and 12 are out of coaxial relation. The sealing ring 344 is preferably bent to shape from sheet metal and provided at one end with an outwardly and substantially radially extending annular U-shaped portion 345 whose opposed walls 346 and 347 are clamped about the inner edge of the diaphragm, the wall 346 being folded back upon itself and then directed inwardly towards the bearing balls 14 to provide a tapering sleeve portion 248 which surrounds the inner race ring 10 and has an inner end 349 in sealing contact with the cylindrical surface 45. This sleeve is also supported at its outer end upon the rounded portion 350 of the U-shaped projection 345 to aid in maintaining the desired capillary angle $a$ which in the present showing is reversely positioned with respect to the capillary angles in my other illustrated embodiments and restricts the egress of a liquid or semi-liquid lubricant from the bearing chamber 327. It will be evident, however, that the sealing ring 344 may be reversely secured to the diaphragm to provide a capillary angle in the opposite direction.

It is not desired to limit my sealing devices to bearings, as shown, since these sealing devices are also applicable in the same general manner and with equal facility for sealing the space between other relatively movable members, such as the space between a housing and a shaft.

I claim:

1. In a device of the character indicated, a pair of relatively rotatable annularly spaced members, a sealing element supported by and in freely movable cylindrically sealing contact with one of said members, an annular diaphragm between said members, said element having a portion folded back into clamped sealing engagement with both sides of the diaphragm at one edge thereof, and means for sealingly securing the other edge of the diaphragm to said other member; substantially as described.

2. In a device of the character indicated, a pair of relatively rotatable annularly spaced members, a cylindrical face on one of said members, a substantially rigid sealing ring supported by said face, a laterally extending tapering sleeve portion on said ring forming a capillary angle with said face, a reduced end on the sleeve portion in freely movable sealing contact with said face, a flexible annular diaphragm between the ring and said other member, a folded-over portion on the ring sealingly clamped to the diaphragm, and means sealingly securing the diaphragm to said other member; substantially as described.

3. In a device of the character indicated, a pair of relatively rotatable members having an annular space therebetween, one of said members being provided with an annular groove opening into said space and having divergent side walls, a sealing element supported by said other member in freely movable sealing relation therewith, a yieldable annular diaphragm secured to the sealing element, and a holding member having a curled-over portion wedged between one of the side walls and the diaphragm and clamped against said diaphragm; substantially as described.

4. In a device of the character indicated, a pair of relatively rotatable annular spaced members, one of said members having an annular groove opening towards said other member, an annular sealing ring supported by said other member in freely movable sealing engagement therewith, a portion of said ring being folded-back over itself, a flexible annular diaphragm having one edge clamped to the ring in sealing relation by said folded-back portion and having its other edge located in said groove, and an annular holder having a curled-over edge wedged in the groove and sealingly securing the diaphragm to the grooved member; substantially as described.

5. In a device of the character indicated, a pair of relatively rotatable spaced members, one of the members having an annular groove opening towards said other member, a sealing ring supported by said other member in freely movable sealing contact, an annular yieldable diaphragm secured at one edge to the ring and having its other edge extending into the groove, and an annular guard having a peripherally extending curled-over portion wedged between one side of the groove and the diaphragm, said guard extending substantially completely between said relatively rotatable members at one side of the diaphragm; substantially as described.

6. In a device of the character indicated, a pair of relatively rotatable annularly spaced inner and outer members, the outer member having an annular groove opening into the space between said members, a substantially rigid sealing ring supported on the periphery of said inner member and in freely movable sealing contact therewith, a yieldable annular diaphragm having an outer edge located in said groove, means sealingly securing the inner edge of the diaphragm to said sealing ring, an annular guard having an outer zone engaging one side of the diaphragm and an inner zone laterally spaced from the diaphragm, and a curled-over peripheral edge on the guard wedged in the groove against said diaphragm and sealingly securing the diaphragm to said outer member; substantially as described.

7. In a unit-handling sealing device, a pair of annular holders, a yieldable diaphragm between said holders and having a laterally extending tubular portion projecting through one of the holders, a sealing ring secured to said tubular portion, the holders being laterally spaced from the diaphragm adjacent said tubular portion, and a curled-over portion on the outer peripheral edge of one of said holders and engaging said other holder to clamp the outer portion of said diaphragm between the holders; substantially as described.

8. In a device of the character indicated, a pair of relatively rotatable inner and outer members, a sealing ring on the inner member and having at one end an annular outwardly extending portion substantially U-shaped in cross section, one side of said outwardly extending portion being bent back upon itself and having a lateral tubular projection receiving said inner member in sealing engagement, and a yieldable annular diaphragm clamped in the outwardly extending portion and secured to said other member; substantially as described.

9. In a device of the character indicated, a pair of relatively rotatable members one of which has a seal engaging surface, an axially projecting tapering sleeve portion on the other member sealingly and angularly contacting said surface, and projecting means on the said other member engaging said surface in spaced relation to the portion in sealing contact for maintaining said angular relation; substantially as described.

10. In a device of the character indicated, a pair of relatively rotatable members one of which has a seal supporting surface, an annular sheet metal extension on said other member supported by the surface and freely movable thereon in angular sealing contact, and projections on said extension engaging the surface and maintaining said angular relation; substantially as described.

WILLIAM T. MURDEN.